(12) United States Patent   (10) Patent No.: US 7,295,120 B2
Waldner et al.   (45) Date of Patent: Nov. 13, 2007

(54) DEVICE FOR VERIFYING A LOCATION OF A RADIO-FREQUENCY IDENTIFICATION (RFID) TAG ON AN ITEM

(75) Inventors: Michele A. Waldner, Minneapolis, MN (US); David P. Erickson, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 159 days.

(21) Appl. No.: 11/008,858

(22) Filed: Dec. 10, 2004

(65) Prior Publication Data

US 2006/0139172 A1    Jun. 29, 2006

(51) Int. Cl.
G08B 13/14 (2006.01)
(52) U.S. Cl. .................. 340/572.7; 340/572.8; 340/572.1; 340/825.49; 235/385
(58) Field of Classification Search ............ 340/572.7, 340/572.8, 572.1; 235/385
See application file for complete search history.

(56) References Cited

U.S. PATENT DOCUMENTS

| | | |
|---|---|---|
| 3,750,167 A | 7/1973 | Gehman et al. |
| 4,219,296 A | 8/1980 | Fujii et al. |
| 4,376,936 A | 3/1983 | Kott |
| 4,457,016 A | 6/1984 | Pfeffer |
| 4,636,634 A | 1/1987 | Harper et al. |
| 4,636,950 A | 1/1987 | Caswell et al. |
| 4,658,357 A | 4/1987 | Carroll et al. |
| 4,688,026 A | 8/1987 | Scribner et al. |
| 4,814,742 A * | 3/1989 | Morita et al. ............ 340/10.31 |
| 4,835,372 A | 5/1989 | Gombrich et al. |
| 4,862,160 A | 8/1989 | Ekchian et al. |
| 4,879,756 A | 11/1989 | Stevens et al. |
| 4,924,219 A | 5/1990 | Sato |
| 4,952,928 A | 8/1990 | Carroll et al. |
| 4,973,086 A | 11/1990 | Donnelly et al. |

(Continued)

FOREIGN PATENT DOCUMENTS

EP    0 740 262    10/1996

(Continued)

OTHER PUBLICATIONS

U.S. Application entitled "Radio Frequency Identification Tags with Compensating Elements," Egbert et al., filed Mar. 23, 2004, having U.S. Appl. No. 10/807,072.

(Continued)

*Primary Examiner*—Jeffery Hofsass
*Assistant Examiner*—Hoi C. Lau
(74) *Attorney, Agent, or Firm*—Melissa E. Buss

(57) ABSTRACT

A device for verifying a location of a radio-frequency identification (RFID) tag on an item. One embodiment of the invention provides a device for verifying the location of an RFID tag on an item including: an item holder; and an RF antenna attached to the item holder, where the item holder includes a readable volume where the RF antenna can read or write to an RFID tag, and where the item holder includes a non-readable volume where the RF antenna cannot read or write to an RFID tag. The present invention also relates to methods of verifying the location of a radio-frequency identification (RFID) tag on an item.

22 Claims, 4 Drawing Sheets

U.S. PATENT DOCUMENTS

| | | | |
|---|---|---|---|
| 5,063,380 A | 11/1991 | Wakura | |
| 5,151,684 A | 9/1992 | Johnsen | |
| 5,204,670 A | 4/1993 | Stinton | |
| 5,231,273 A | 7/1993 | Caswell et al. | |
| 5,276,431 A | 1/1994 | Piccoli et al. | |
| 5,287,414 A | 2/1994 | Foster | |
| 5,288,980 A | 2/1994 | Patel et al. | |
| 5,327,115 A | 7/1994 | Swierczek | |
| 5,334,822 A | 8/1994 | Sanford | |
| 5,369,699 A | 11/1994 | Page et al. | |
| 5,389,919 A | 2/1995 | Warren et al. | |
| 5,424,858 A | 6/1995 | Gillotte | |
| 5,426,284 A | 6/1995 | Doyle | |
| 5,434,775 A | 7/1995 | Sims et al. | |
| 5,450,070 A | 9/1995 | Massar et al. | |
| 5,455,410 A | 10/1995 | Schneider | |
| 5,459,657 A | 10/1995 | Wynn et al. | |
| 5,493,492 A | 2/1996 | Cramer et al. | |
| 5,537,105 A | 7/1996 | Marsh et al. | |
| 5,541,585 A | 7/1996 | Duhame et al. | |
| 5,581,707 A | 12/1996 | Kuecken | |
| 5,610,596 A | 3/1997 | Petitclerc | |
| 5,635,693 A | 6/1997 | Benson et al. | |
| 5,682,142 A | 10/1997 | Loosmore et al. | |
| 5,689,238 A | 11/1997 | Cannon, Jr. et al. | |
| 5,708,423 A | 1/1998 | Ghaffari et al. | |
| 5,739,765 A | 4/1998 | Stanfield et al. | |
| 5,745,036 A | 4/1998 | Clare | |
| 5,751,221 A | 5/1998 | Stanfield et al. | |
| 5,771,003 A * | 6/1998 | Seymour | 340/572.1 |
| 5,777,884 A * | 7/1998 | Belka et al. | 700/225 |
| 5,794,213 A | 8/1998 | Markman | |
| 5,798,693 A | 8/1998 | Engellenner | |
| 5,799,302 A | 8/1998 | Johnson et al. | |
| 5,804,810 A | 9/1998 | Woolley et al. | |
| 5,814,797 A | 9/1998 | Rifkin | |
| 5,887,176 A | 3/1999 | Griffith et al. | |
| 5,920,261 A | 7/1999 | Hughes et al. | |
| 5,929,780 A | 7/1999 | Pagnol et al. | |
| 5,936,527 A * | 8/1999 | Isaacman et al. | 340/572.1 |
| 5,991,742 A | 11/1999 | Tran | |
| 5,995,017 A | 11/1999 | Marsh et al. | |
| 6,028,518 A | 2/2000 | Rankin et al. | |
| 6,075,441 A | 6/2000 | Maloney | |
| 6,100,804 A | 8/2000 | Brady et al. | |
| 6,127,928 A | 10/2000 | Issacman et al. | |
| 6,137,411 A | 10/2000 | Tyren | |
| 6,141,649 A | 10/2000 | Bull | |
| 6,154,137 A | 11/2000 | Goff et al. | |
| 6,173,900 B1 | 1/2001 | Yoshigi et al. | |
| 6,195,007 B1 * | 2/2001 | Takayama et al. | 340/572.1 |
| 6,204,764 B1 | 3/2001 | Maloney | |
| 6,232,870 B1 | 5/2001 | Garber et al. | |
| 6,240,091 B1 | 5/2001 | Ginzboorg et al. | |
| 6,318,636 B1 | 11/2001 | Reynolds et al. | |
| 6,324,437 B1 | 11/2001 | Frankel et al. | |
| 6,330,971 B1 | 12/2001 | Mabry et al. | |
| 6,335,686 B1 | 1/2002 | Goff et al. | |
| 6,354,493 B1 | 3/2002 | Mon | |
| 6,400,997 B1 | 6/2002 | Rapp, III | |
| 6,411,211 B1 | 6/2002 | Boley et al. | |
| 6,462,656 B2 | 10/2002 | Ulrich et al. | |
| 6,496,806 B1 | 12/2002 | Horwitz et al. | |
| 6,693,539 B2 | 2/2004 | Bowers et al. | |
| 6,768,419 B2 | 7/2004 | Garber et al. | |
| 2002/0196126 A1 | 12/2002 | Eisenberg et al. | |
| 2003/0189490 A1 | 10/2003 | Hogerton et al. | |
| 2006/0119481 A1 * | 6/2006 | Tethrake et al. | 340/572.1 |

FOREIGN PATENT DOCUMENTS

| | | |
|---|---|---|
| EP | 0 794 507 | 9/1997 |
| EP | 0 944 085 | 9/1999 |
| EP | 1 033 675 | 9/2000 |
| EP | 1 139 278 | 10/2001 |
| GB | 2 288 299 | 10/1995 |
| JP | 56-110193 | 9/1981 |
| WO | WO 89/04016 | 5/1989 |
| WO | WO 94/22580 | 10/1994 |
| WO | WO 98/13800 | 4/1998 |
| WO | WO 98/16849 | 4/1998 |
| WO | WO 98/27670 | 6/1998 |
| WO | WO 98/59258 | 12/1998 |
| WO | WO 99/05660 | 2/1999 |
| WO | WO 99/10839 | 3/1999 |
| WO | WO 00/10122 | 2/2000 |
| WO | WO 00/10144 | 2/2000 |
| WO | WO 00/16280 | 3/2000 |
| WO | WO 00/43805 | 7/2000 |
| WO | WO 00/65532 | 11/2000 |
| WO | WO 00/77704 | 12/2000 |
| WO | WO 01/03058 | 1/2001 |
| WO | WO 01/90849 | 11/2001 |

OTHER PUBLICATIONS

Herdeen, Frederick et al., "Get a lock on inventory", Security Management, Arlington, Oct. 1996, 6 pages.

Hedlund, Jeff et al., "SmartBookcase", Sep. 13, 2001, 2 pages.

"VTLS RFID Solution" from VTLS Inc. Web site, dated Sep. 13, 2001, 2 pages.

Article entitled "Never lose a file again", Findentity® RF in cooperation with X-ident, Texas Instruments and Leitz, 6 pages, 2004.

Finkenzeller, Klaus, "RFID Handbook—Radio Frequency Identification Fundamentals and Applications", 1999, pp. 227-273.

U.S. Appl. No. 10/820,584, entitled "Variable Frequency Radio Frequency Identification (RFID) Tags," Waldner et al., filed Apr. 8, 2004.

* cited by examiner

DEVICE FOR VERIFYING A LOCATION OF A RADIO-FREQUENCY IDENTIFICATION (RFID) TAG ON AN ITEM

TECHNICAL FIELD

The present invention relates to a device for verifying a location of a radio-frequency identification (RFID) tag on an item. The present invention relates more particularly to a device for verifying the location of an RFID tag on an item including: an item holder; and an RF antenna attached to the item holder, where the item holder includes a readable volume where the RF antenna can read or write to an RFID tag, and where the item holder includes a non-readable volume where the RF antenna cannot read or write to an RFID tag. The present invention also relates more particularly to methods of verifying the location of a radio-frequency identification (RFID) tag on an item.

BACKGROUND OF THE INVENTION

Radio-Frequency Identification (RFID) technology has become widely used in virtually every industry, including transportation, manufacturing, waste management, postal tracking, airline baggage reconciliation, and highway toll management. A typical RFID system includes a plurality of RFID tags, at least one RFID reader or detection system having an antenna for communication with the RFID tags, and a computing device to control the RFID reader. The RFID reader includes a transmitter that may provide energy or information to the tags, and a receiver to receive identity and other information from the tags. The computing device processes the information obtained by the RFID reader.

A variety of RFID applications, systems and tags are known. For example, U.S. Patent Application Publication entitled, "Radio Frequency Identification in Document Management," (Eisenberg et al.), Publication No. 2002/0196126 A1, discloses various systems and methods of handling items with RFID tags, such as files. As another example, PCT Publication WO 00/10122 A2, "Radio Frequency Identification Systems Applications," (Garber, et al.) describes the use of RFID systems for use with items of interest having RFID tags, such as in a library. As yet another example, U.S. Pat. Ser. No. 6,768,419, "Applications for Radio Frequency Identification Systems" (Garber, et al.) describes RFID devices, including handheld RFID devices, and applications for such devices. Another example, U.S. Patent Publication No. 2003/0189490 A1, "Radio-Frequency Identification Tag and Tape Applicator, Radio-Frequency Identification Tag Applicator, and Methods of Applying Radio-Frequency Identification Tags" describes methods of applying a radio-frequency identification tag to tape and radio-frequency identification tag and tape applicators.

One example of RFID tags is described in U.S. patent application Ser. No. 10/820,584, entitled "Variable Frequency Radio Frequency Identification (RFID) Tags," (Waldner and Erickson), which describes various radio frequency identification (RFID) tags that dynamically vary their resonant frequency to reduce or eliminate the potential effects of electromagnetic "tag-to-tag" coupling. Another example of RFID tags is described in U.S. patent application Ser. No. 10/807,072, "Radiofrequency Identification Tags with Compensating Circuitry."

SUMMARY OF THE INVENTION

One aspect of the present invention provides a device for verifying a location of a radio-frequency identification (RFID) tag on an item. In one embodiment, the device comprises: an item holder; and an RF antenna attached to the item holder, where the item holder includes a readable volume where the RF antenna can read or write to an RFID tag, and where the item holder includes a non-readable volume where the RF antenna cannot read or write to an RFID tag.

In another embodiment, the device for verifying a location of a radio-frequency identification (RFID) tag on an item comprises: an item holder; and an RF antenna attached to the item holder, where the item holder includes a readable volume where the RF antenna can read or write to an RFID tag, where the item holder includes a non-readable volume where the RF antenna can not read or write to an RFID tag, when an RFID tag is within the readable volume of the item holder, then the RFID tag is properly located on the item, and when an RFID tag is within the non-readable volume of the holder, the RFID tag is not properly located on the item.

In yet another embodiment, the device for verifying a location of a radio-frequency identification (RFID) tag on an item comprises: an item holder; and an RF antenna attached to the item holder, where the RF antenna is designed to provide a readable volume where the RF antenna can read or write to an RFID tag, where the item holder is designed to further shape the readable volume of the RF antenna, and where if an RFID tag is within the readable volume of the RF antenna, then the device verifies that the RFID tag is properly located on the item.

The present invention also provides a system for verifying a location of a radio-frequency identification (RFID) tag on an item. In one embodiment, the system comprises: an item holder; an RF antenna attached to the item holder, where the item holder includes a readable volume where the RF antenna can read or write to an RFID tag, where the item holder includes a non-readable volume where the RF antenna can not read or write to an RFID tag; and an item having an RFID tag attached to the item associated with the item holder where if the RFID tag is within the readable volume of the item holder, then the system verifies that the RFID tag is properly located on the item, and where if the RFID tag is not within the readable volume of the item holder, then the system verifies that the RFID tag is not properly located on the item.

In one aspect of the embodiments mentioned above, the device or system further includes an RFID reader in operative connection to the RF antenna, where the RF antenna transmits read or write command signals to RFID tags from the RFID reader. In another aspect of the embodiments mentioned above, when an RFID tag is within the readable volume, the RFID tag is properly located on an item, and when an RFID tag is within the non-readable volume of the holder, the RFID tag is not properly located on an item. In another aspect of the embodiments mentioned above, the device signals to a user if the RFID tag is properly located on an item. In yet another aspect of the embodiments mentioned above, the item holder further comprises metal in the non-readable volume. In another aspect of the embodiments mentioned above, the device or system further comprises a sensor attached to the item holder, when the sensor is activated, the RF antenna transmits read or write command signals to RFID tags. In yet another aspect of the embodiments mentioned above, the device or system further comprises a file having an RFID tag attached to the file associated with the item holder.

The present invention also provides a method of verifying the location of a radio-frequency identification (RFID) tag on an item. In one embodiment, the method comprising the steps of: providing a device for verifying a location of a radio-frequency identification (RFID) tag on an item, comprising: an item holder; and an RF antenna attached to the item holder, where the item holder includes a readable volume where the RF antenna can read or write to an RFID tag, and where the item holder includes a non-readable volume where the RF antenna cannot read or write to an RFID tag; attaching an RFID tag to an item; inserting the item into the device; transmitting write command signals to the RFID tags; and verifying the proper location of the RFID tag on the item, if the signals were successfully read or written on the RFID tag.

In one aspect of the above method, the device further comprises an RFID reader in operative connection to the RF antenna, where the transmitting step includes the RF antenna transmitting read or write command signals to RFID tags from the RFID reader. In another aspect of the above method, the verifying step further comprises signaling that the RFID tag is in a proper location on the item when the signals were successfully read or written on the RFID tag. In another aspect of the above method, the verifying step further comprises verifying the proper location when the RFID tag on the item is within the readable volume of the item holder, and signaling that the RFID tag is not in a proper location on the item when the RFID tag on the item is not within the readable volume of the holder. In yet another aspect of the above method, the item holder further comprises metal in the non-readable volume. In another aspect of the above method, the device further comprises a sensor attached to the item holder, and when the sensor is activated, the RF antenna transmits read or write command signals to RFID tags. In yet another aspect of the above method, the attaching step comprises attaching the RFID tag to a file.

BRIEF DESCRIPTION OF THE DRAWINGS

The present invention will be further explained with reference to the appended Figures, wherein like structure is referred to by like numerals throughout the several views, and wherein.

DETAILED DESCRIPTION OF THE INVENTION

A variety of items or objects are now being tagged with radio frequency identification (RFID) tags for use in RFID systems that will assist in identifying the item and tracking the item through various processes. The present invention provides a device and methods for verifying a location of a RFID tag on an item or object. For a variety of applications and processes, it may be necessary to have the RFID tag located in a particular area on the item and not located in other areas on the item, and where it is desirable to have an RFID tag attached to the item in a predictable location, depending on the application or process. If the RFID tag is not located in its proper location on the object, the RFID system may fail to read the RFID tag and as a result, the information stored on the RFID tag will not be recorded by the RFID system and it will affect the performance of the RFID system and systems or persons relying upon information read by the RFID system. Therefore, there is a need to provide a device and methods that assist a user in verifying whether or not an RFID tag is properly located on an item or object.

One example where RFID tag placement on items or objects could be important are on products that are being further processed by a customer. For example, pallets being delivered to Wal*mart stores are now required to each have RFID tags that identify the products on the pallet. The Wal*mart stores may have specific methods of reading the RFID tags with particular RFID readers and particular methods of unloading the products from the pallet. To meet Wal*mart's requirements for further processing, the provider of the products may need to attach the RFID tag in a particular location on the pallet to make it easier for Wal*mart to further process the pallet and the items thereon at their locations.

As another example, many parts are being provided with RFID tags where the parts are later assembled into a final product or assembly by a customer. When the parts are supplied to the customer, the placement of the RFID tag could be important when it comes time for the customer to assemble their final product. The customer may require that the part include the RFID tag in a particular location, so that when the final product is assembled the RFID tag can be easily read. Otherwise, if the RFID tag is in the wrong location, the RFID tag may not be readable when the final part is assembled.

As yet another example, an item or object may require multiple RFID tags in different locations each having a different frequency. For example, a pallet may require one RFID tag having a frequency of 13.56 MHz and another RFID tag having a frequency of 915 MHz. The 915 MHz tag has a longer read range and may be read in the warehouse, when the pallet is being stored. The 13.56 MHz tag has a shorter read range and may be read along a conveyor belt as it is being transported to the manufacturing line.

Figure 1:
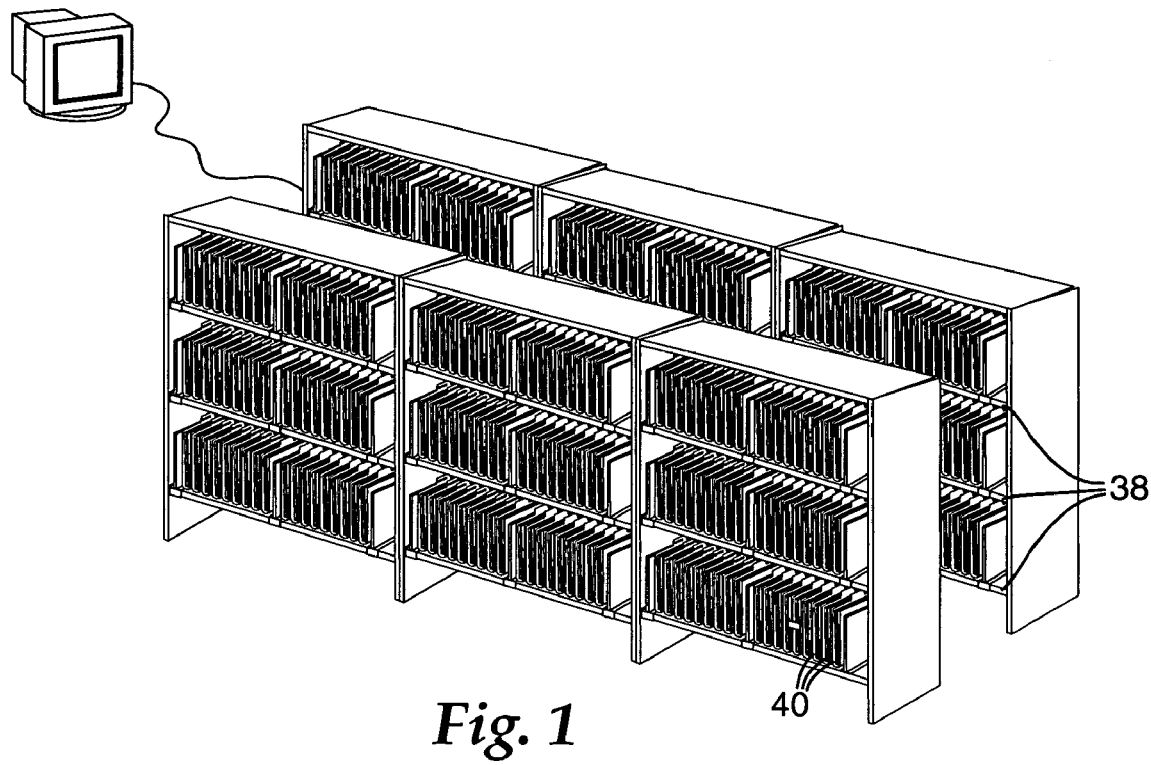
FIG. 1 is a front perspective view of a file tracking system.

Another example of items having an RFID tag attached to them is files. Despite some interest in converting offices to paperless environments in which paper documents are entirely replaced by electronic versions of those documents, a number of industries continue to rely heavily on paper documents. Examples include law offices, government agencies, and facilities for storing business, criminal, and medical records. In some instances these records are stored in enclosed filing cabinets. In other instances, the files 40 are positioned on open shelves 38 of the type shown in FIG. 1. Documents and files can also be found in other locations, including on desks and tables, in drawers, on carts, or stacked on the floor.

At least three patent publications describe the use of radio frequency identification (RFID) systems for document or file management: 1) U.S. Pat. Ser. No. 5,689,238 (Cannon, Jr. et al.); 2) PCT Published patent application Ser. No. WO 00/16280; and 3) U.S. Patent Application Publication entitled, "Radio Frequency Identification in Document Management," (Eisenberg et al.), Publication Ser. No. 2002/0196126 A1, which is assigned to the assignee of the present invention and the contents of which are incorporated by reference herein. Although the various aspects of the present invention will largely be described in the context of files or documents or both, the device of the present invention may be used in verifying the location of RFID tags on other items including books, video tapes, optically-recorded media, or retail items, pallets, containers, or other assets, as appropriate, whether or not each of these items is specifically called out as an alternative application.

RFID tags or labels 42 are made by various manufacturers including Texas Instruments of Dallas Tex., under the designation "Tag-it". Another type of RFID tag is actually a combination tag that includes an RFID element and a magnetic security element, and is described in U.S. Pat. No. 6,154,137, which is assigned to the assignee of the present invention, the contents of which is incorporated by reference herein. Yet another type of RFID tag is described in U.S. patent application Ser. No. 10/820,584, entitled "Variable Frequency Radio Frequency Identification (RFID) Tags," (Waldner and Erickson), which is assigned to the assignee of the present invention, the contents of which is incorporated by reference herein. An RFID tag typically includes an integrated circuit with a certain amount of memory, a portion of which may be used by the manufacturer to write certain information to the tag (and perhaps lock it to protect it from being changed or overwritten), and another portion of which may be used by a purchaser to store additional information to the tag. The integrated circuit is operatively connected to a radio frequency (RF) antenna that receives RF energy from a source and also backscatters RF energy in a manner well known in the art. It is this backscattered RF energy that provides a signal that may be received by an interrogator or reader to obtain information about the RFID tag, and the item with which it is associated. RFID tags may operate in one or more different frequency ranges, such as the Tag-it RFID tags sold by Texas Instruments, which operate at 13.56 MHz.

RFID tags may be associated with or applied to items of interest, as described above. The tag may even be embedded within the item or the packaging of the item so that the tag is at least substantially imperceptible, which can help to prevent detection and tampering. Thus, it would be possible to "source-mark" items with an RFID tag, such as inserting an RFID tag into or applying an RFID tag to an item during its manufacture, as with a book, compact disc, consumer product, file folder, pallet, carton, box-sealing tape, shipping label, or the like.

In conventional RFID systems, RFID tags may interfere with one another when the RFID tags are placed in close proximity to one another. It has been determined that electromagnetic coupling between such tags may result in a shift of the resonant frequencies of the tags. This shifted resonant frequency may not provide a given one of the RFID tags with a sufficient induced current to power the tag, thereby causing the RFID tag to be out of the detectable frequency range of the interrogation device.

In general, the magnitude of the resulting frequency shift is dependent upon the distance between the RFID tags, the size of the tags, the amount of coplanar overlapping that occurs between the tags, and the total number of tags that overlap. Some exemplary measurements of frequency shift due to "tag-to-tag" coupling are shown in Table 1 below when multiple tags where placed within a fixed proximity of each other in an overlapping position. In Table 1, A is the height of the tag, B is the width of the tag, N is the number of overlapping tags, X is the distance between consecutive tags, and F is the resultant resonant frequency of the tag. Although the exemplary measurements shown in Table 1 are downward frequency shifts, the frequency shifts caused by tag coupling may also be upward frequency shifts. As can be seen from Table 1, electromagnetic coupling between ten overlapping tags at the given separation distance can shift the frequency at which the tags respond approximately 2 MHz, which may result in the inability for the reader to successfully communicate with the tags, or in a significantly reduced read range.

TABLE 1

| A (Inches) | B (Inches) | N | X (Inches) | F (MHz) |
| --- | --- | --- | --- | --- |
| 2 | 3 | 1 | — | 13.56 |
| 2 | 3 | 2 | .75 | 13.2 |
| 2 | 3 | 10 | .75 | 10.5 |
| .5 | 1.5 | 1 | — | 13.56 |
| .5 | 1.5 | 2 | .375 | 13.4 |
| .5 | 1.5 | 10 | .375 | 10.6 |

One method of overcoming the tag-to-tag interaction is to reduce the degree to which adjacent tags overlap each other. This can be done by increasing the distance between adjacent tags. Alternatively, tag-to-tag interaction may be reduced by systematically staggering the locations of RFID tags associated with file folders, documents, containers, or other items so that it is very unlikely that the tags on two adjacent items would overlap each other to any substantial degree. Use of the device 10 of the present invention to verify the proper placement in a systematically staggered tag system would also help ensure proper functioning of such a system.

However, it may not always be possible to increase the distance between adjacent tags on items, such as requiring fixed file storage spacers, because it may require additional filing space that may be expensive to maintain. It also may not always be possible to stagger the locations of the RFID tags because although this method may initially reduce the tag-to-tag interaction when the files are first stored on the shelf, due to the insertion and removal of files over time, the files may become unordered and ultimately lead to the overlapping of tags and thus, tag-to-tag interaction.

The inventors of the present invention have discovered that the magnitude of the resulting frequency will tend to stabilize after a certain number of tags on various items have been successively overlapped. As a result, if a series of similar items each having an RFID tag attached to them in relatively the same general area are stacked either vertically or horizontally relative to each other (for example, RFID tagged files stored on a shelf illustrated in FIG. 2), such that the RFID tags on the items overlap causing tag-to-tag interaction, then it is possible to predict and control the magnitude of the resulting resonant frequency. For example, if ten items each having an RFID tag of approximately the same general area and the antennas of the RFID tags are tuned to approximately 20 MHz, then an RFID reader operating at 13.56 MHz will be able to successfully read the majority of the RFID tags when the items are adjacent one another. However, to achieve the desired resonant frequency that is a result of the tag-to-tag interaction in an application such as closely spaced files, it is desirable to attach the RFID tags to the items in the same general area. For example, files 40 illustrated on the shelf 38 in FIG. 2 each have an RFID tag 42 that is attached in approximately the same area of the file 40, such that when the files are aligned and stored on the shelf 38, the RFID tags on adjacent files are placed in close proximity to one another to achieve the desired tag-to-tag interaction.

Figure 2:
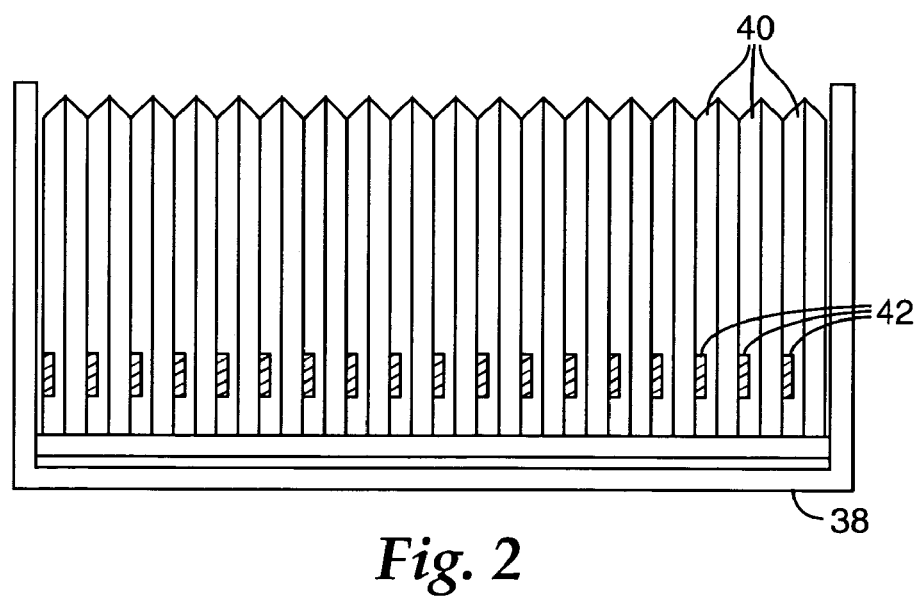
FIG. 2 is a side view of a row of files stored on a shelf in the file tracking system of FIG. 1.
Figure 3:
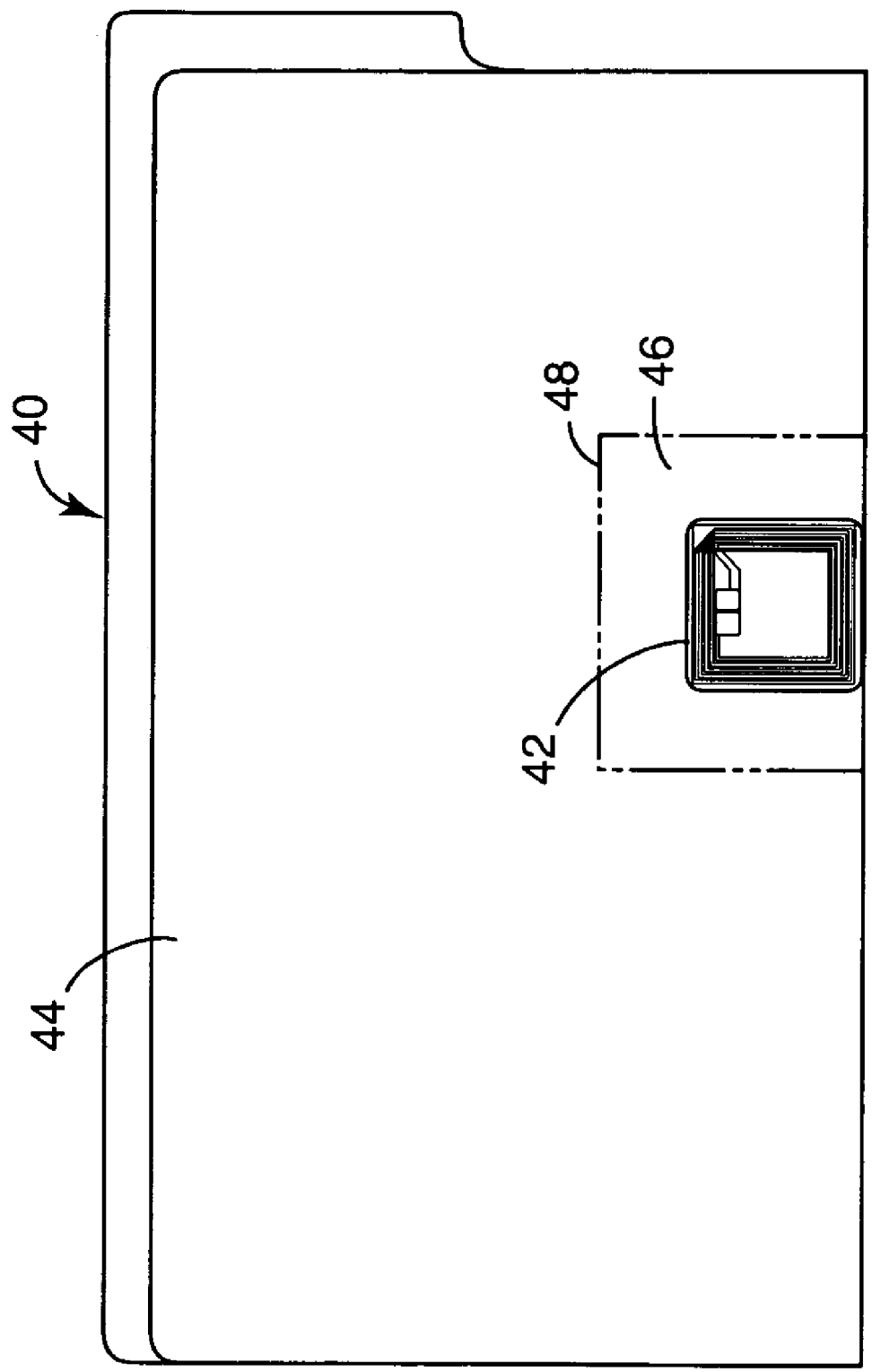
FIG. 3 is a side view of a file having an RFID tag.

FIG. 3 illustrates one embodiment of a file 40 having an RFID tag 42 attached to it, by adhesive for example, or embedded into the file 40. There is an area 46 on the file where the RFID tag 42 is properly located to help achieve the tag-to-tag interaction described above, when the files are stored along a shelf, as illustrated in FIG. 2. If the RFID tag 42 is attached anywhere outside of that area 46 on the file 40, then it is not properly located on the file 40 to achieve the desired tag-to-tag interaction, and in turn, the desired performance of the RFID system. The area 48 is determined based on the antenna design and its read range or antenna volume described in more detail below.

The present invention provides a device for verifying the location of an RFID tag on an item, which is useful for achieving the desired tag-to-tag interaction when the files are placed in close proximity to one another, as described above. However, the present invention is more broadly useful for preparing items where it is desirable to have an RFID tag attached to the item in a predictable location, depending on the application of the item in an RFID system. For example, for RFID tagged items used in an RFID system that includes placing such items on a conveyor where the conveyor has a stationary RFID reader, each item must be read by the RFID reader as it passes by the reader. For this application, it may be desirable to have the RFID tag in an area easily readable by the reader, as the item progresses past the reader along the conveyor belt, and therefore the RFID tag should be in relatively the same area on each item to enhance the performance of the system.

Figure 4:
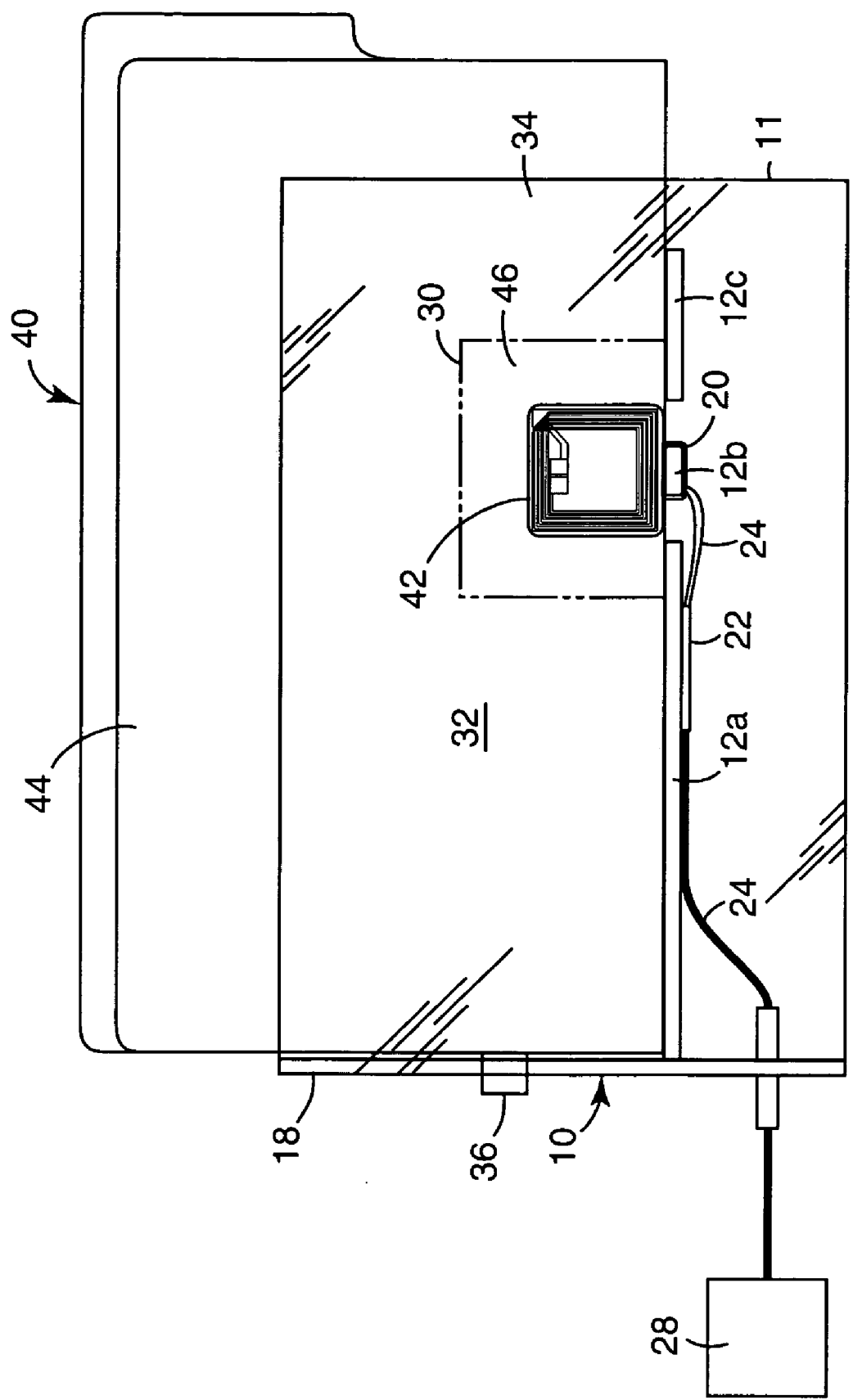
FIG. 4 is a side view of one embodiment of the device of the present invention for verifying a location of a radio-frequency identification tag on an item, and an item inserted into the device, such as the file of FIG. 3.
Figure 5:
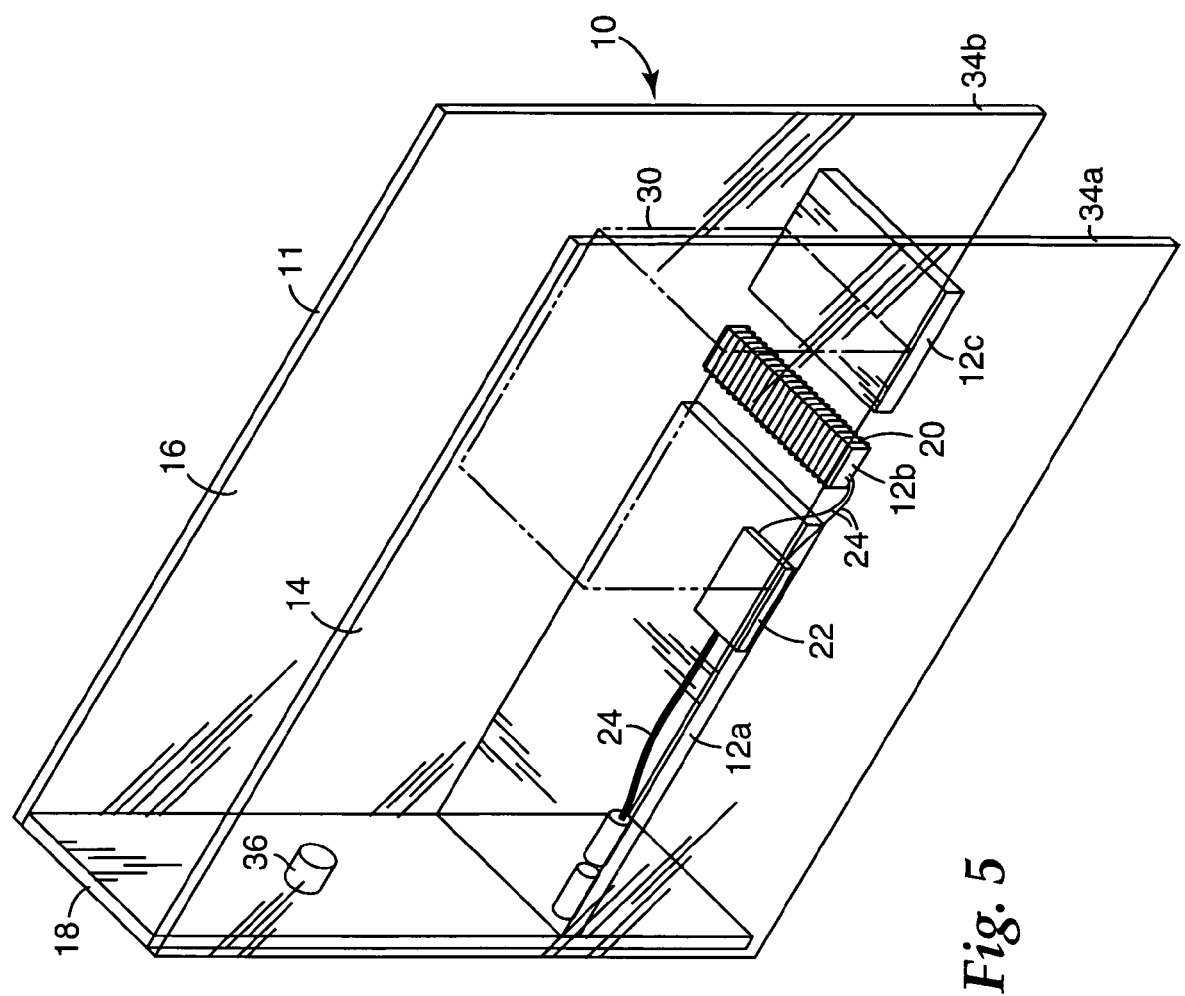
FIG. 5 is a perspective view of the device of FIG. 4.

FIG. 4 illustrates one embodiment of the device 10 of the present invention with an item 40 having an RFID tag 42 placed in the device 10. FIG. 5 illustrates the device 10 by itself.

In the embodiment illustrated in FIGS. 4 and 5, the device 10 includes an item holder having a first support 12, a second support 14, a third support 16, and a fourth support 18. The second support 14 and third support 16 are parallel to one another and preferably provides vertical support for the item 40. The fourth support 18 is perpendicular to the second support 14 and the third support 16, and also preferably provides vertical support for the item 40. The second support 14, third support 16, and fourth support 18 are rectangular in shape and the third support 18 adjoins the first support 14 to the second support 16 forming walls for an item 40 to be placed between. The first support 12 is made from three separate portions 12a, 12b, and 12c, and preferably provides horizontal support for the item. The first support 12 is mounted in the lower half of the device between the second support wall 14 and third support wall 16, and is preferably perpendicular to both the second and third support walls 14, 16 and the fourth support 18.

Preferably, the supports 12, 14, 16, 18 are made from clear plastic or other nonmetallic materials, however other suitable materials may be used. The supports 12, 14, 16, 18 may be adjoined in any way known in the art, for example, by adhesive. Alternatively, the supports 12, 14, 16, 18 may be formed into a unitary support. Although the embodiment of the device 10 illustrated in FIGS. 4 and 5 is sized and shaped to hold a file, the device of the present invention may be sized and shaped to hold or support any item having an RFID tag. The item holder can be any arrangement of an antenna relative to an item having an RFID tag such that the antenna is designed to ensure and verify proper placement of the RFID tag on the item for the specific system or application. For instance, the device 10 may include an item holder that is a support with a flat surface, where the item is placed on top of the flat surface.

The device 10 includes an RF antenna 20 for reading and writing command signals to an RFID tag 42. The antenna 20 preferably is a helical antenna or a loop antenna, however any RF antenna known in the art is suitable dependent upon system requirements. In the embodiment illustrated in FIGS. 4 and 5, the antenna is attached to a portion of the first support 12b. The device 10 includes an RFID reader or interrogation source 28. The RFID reader 28 is in operative connection to the RF antenna 20. The RFID reader signals to the user if the RFID tag is not properly read or written by the RF antenna. The device 10 preferably includes a circuit board 22, with its associated components, and wires 24 for connecting the RF antenna 20 to the RFID reader 28. One suitable example of a commercially available RFID reader is available from Royal Philips Electronics located in Eindhoven, Netherlands as part number SLRM900.

The folder 40 has an RFID tag 42 attached to it at a certain predetermined location. The holder 11 is designed to receive the folder 40 with the RFID tag 42. When the folder 40 is inserted into the holder 11, it is supported horizontally by the first support 12 and supported vertically by the second support 14 and third support 16, and fourth support 18. When the folder 40 is inserted into the holder 11, the RFID tag 42 on the folder 44

The device 10 verifies the location of the RFID tag 42 on the item, such as a folder 40, by successfully reading information from or writing information to the RFID tag. If there is a successful read of information from or write of information to the RFID tag, it is assumed then that the RFID tag 42 is properly located on the item 40. However, if there is not a successful reading or writing of information, then it is assumed that the RFID tag 42 is in the wrong location on the item 40 and it will have to be removed and replaced with an RFID tag 42 in the proper location. Alternatively, if there is not a successful reading or writing of information, then it may be assumed that the RFID tag 42 is not properly functioning. The antenna 20 on the device 10 is designed so that it will only read or write information successfully on the RFID tag 42, if the RFID tag 42 is located within certain areas in or relative to the item holder 11. As a result of the antenna design, the device has a certain area or volume in which the RF antenna can successfully read or write to an RFID tag 42, which is indicated as the readable volume 30. This volume is determined by the antenna type, size, power, and the use of an optional metal layer or other suitable materials in the device, discussed in more detail below. One skilled in the art may use these various factors to design a suitable RF antenna for the specific application.

The device 10 may include optional metal layer 34 to help shield the areas of the item 40 that preferably do not include an RFID tag 42 or areas that are not to be readable or writeable for the applicable system. For instance, metal layers 34 may be included in the second support 14 and third support 16. The metal layers are sized and shaped to surround portions of the outer perimeter of the readable volume 30, to help control the read range or volume of the antenna 20. The metal layer helps reduce the readable volume of the antenna 20 and allow for more control over the acceptable location of the RFID tag 42 on the item 40. Preferably, the metal layer is copper. However, other suitable materials may be used.

The device 10 may include an optional sensor 36. When the sensor 36 is activated, such as by inserting the file 40 into the holder 11, as illustrated in FIG. 4, the antenna reads information from or writes information to the RFID tag 42 on the file 40. Examples of suitable sensors are commercially available from Osrum Opto Semiconductors located in Regensburg, Germany, as part number SFH9240. Other sensors known in the art are suitable, for example, optical sensors, such as photo resistors, transmissive optical sensors, reflective optical sensor or a simple pressure switch.

The device 10 may be designed to include a variety of antennas located in different locations within the holder 11, depending on the desired application. For example, an item may include multiple locations where an RFID tag may be properly located. U.S. Patent Application Publication, "Radio Frequency Identification in Document Management," (Eisenberg et al.), Publication No. 2002/0196126 A1, discloses the need for staggering the location of RFID tags on files. A device 10 according to the present invention could use one antenna to read one RFID tag on a one location on a file and then use a different antenna to read another RFID tag on a different location on another file. The antenna also may be designed to read RFID tags on files even if the file is inserted into the holder in a flipped over position, such that the RFID tag is located on the opposite side of the file. One skilled in the art may design the antenna to include a read range or antenna volume designed for the specific item and for use in a specific application or RFID system.

The present invention has now been described with reference to several embodiments thereof. The foregoing detailed description and examples have been given for clarity of understanding only. No unnecessary limitations are to be understood therefrom. All patents and patent applications cited herein are hereby incorporated by reference. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A device for verifying a location of a radio-frequency identification (RFID) tag on an item, comprising:
    an item holder;
    an RF antenna attached to the item holder; and
    a shielding layer that forms a non-readable volume of the item holder,
    wherein the item holder includes a readable volume where the RF antenna can read or write to the RFID tag attached to an item, wherein the non-readable volume formed by the shielding prevents the RF antenna from reading or writing to the RFID tag attached to the item,
    wherein when the RFID tag is within the readable volume of the item holder, then the RFID tag is properly located on the item, and wherein when the RFID tag is within the non-readable volume of the holder, the RFID tag is not properly located on the item.

2. The device of claim 1, further including an RFID reader in operative connection to the RF antenna, wherein the RF antenna transmits read or write command signals to the RFID tags from the RFID reader.

3. The device of claim 1, wherein the device signals to a user if the RFID tag is properly located on the item.

4. The device of claim 1, wherein the shielding layer further comprises metal.

5. The device of claim 1, further comprising a sensor attached to the item holder, wherein when the sensor is activated, the RF antenna transmits read or write command signals.

6. The device of claim 1, wherein the item comprises a file having the RFID tag attached to the file.

7. A system for verifying a location of a radio-frequency identification (RFID) tag on an item, comprising:
    an item holder;
    an RF antenna attached to the item holder,
    a shielding layer that forms a non-readable volume of the item holder,
    wherein the item holder includes a readable volume where the RF antenna can read or write to an RFID tag, and wherein the non-readable volume formed by the shielding prevents the RF antenna from reading or writing to the RFID tag attached to the item; and
    an item having the RFID tag attached to the item associated with the item holder,
    wherein if the RFID tag is within the readable volume of the item holder, then the system verifies that the RFID tag is properly located on the item, and wherein if the RFID tag is not within the readable volume of the item holder, then the system verifies that the RFID tag is not properly located on the item.

8. The system of claim 7, further including an RFID reader in operative connection to the RF antenna, wherein the RF antenna transmits read or write command signals to the RFID tag from the RFID reader.

9. The system of claim 7, wherein the system signals to a user if the RFID tag is properly located on the item.

10. The system of claim 7, wherein the shielding layer further comprises metal.

11. The system of claim 7, further comprising a sensor attached to the item holder, wherein when the sensor is activated, the RF antenna transimits read or write command signals to the RFID tags.

12. The system of claim 7, wherein the item comprises a file having the RFID tag attached to the file.

13. A method of verifying the location of a radio-frequency identification (RFID) tag on an item, comprising:
    providing a device for verifying a location of a radio-frequency identification (RFID) tag associated with an item, comprising:
        an item holder; and
        an RF antenna attached to the item holder,
        wherein the item holder includes a readable volume where the RF antenna can
        read or write to the RFID tag, end wherein the item holder includes a non-readable
        volume where the RF antenna cannot read or write to the RFID tag; attaching the RFID tag to the item;
    inserting the item into the item holer of the device;
    transmitting write command signals to the RFID tag; and
    verifying the proper location of the RFID tag on the item, if the signals were successfully read or written on the RFID tag by:
        signaling that the RFID tag is in a proper location on the item when the signals were successfully read or written on the RFID tag when the RFID tag on the item is within the readable volume of the item holder; and
        signaling that the RFID tag is not in a proper location on the item when the RFID tag on the item is not within the readable volume of the item holder.

14. The method of claim 13, wherein the device further comprises an RFID reader in operative connection to the RF antenna, wherein the transmitting step includes the RF antenna transmitting read or write command signals to the RFID tag from the RFID reader.

15. The method of claim 13, wherein the item holder further comprises metal in the non-readable volume.

16. The method of claim 13, wherein the device further comprises a sensor attached to the item holder, wherein when the sensor is activated, the RF antenna transmits read or write command signals to the RFID tags.

17. The method of claim 13, wherein the attaching step comprises attaching the RFID tag to a file.

18. The device of claim 1, wherein if the RFID tag is within the readable volume of the RF antenna, then the device verifies that the RFID tag is properly located on the item by;

signaling that the RFID tag is in a proper location on the item when the RFID tag on the item is within the readable volume of the item holder; and signaling that the RFID tag is not in a proper location on the item when the RFID tag on the item is not within the readable volume of the item holder.

19. The device of claim 18, further including an RFID reader in operative connection to the RF antenna, wherein the RF antenna transmits read or write command signals to the RFID tag from the RFID reader.

20. The device of claim 18, wherein the item holder further comprises metal that creates a non-readable volume where the RF antenna cannot read or write to the RFID tag.

21. The device of claim 18, further comprising a sensor attached to the item holder, wherein when the sensor is activated, the RF antenna transmits read or write command signals.

22. The device of claim 18, wherein the item comprises a file having the RFID tag attached to the file.

* * * * *

UNITED STATES PATENT AND TRADEMARK OFFICE
CERTIFICATE OF CORRECTION

PATENT NO. : 7,295,120 B2 Page 1 of 1
APPLICATION NO. : 11/008858
DATED : November 13, 2007
INVENTOR(S) : Michele A. Waldner It is certified that error appears in the above-identified patent and that said Letters Patent is hereby corrected as shown below:

<u>Column 9,</u>
Line 62, delete "tags" and insert in place thereof -- tag --.

<u>Column 10,</u>
Line 36, delete "transimits" and insert in place thereof -- transmits --.

Line 37, delete "tags" and insert in place thereof -- tag --.

Line 49, delete "end" and insert in place thereof -- and --.

Line 53, delete "holer" and insert in place thereof -- holder --.

<u>Column 11,</u>
Line 9, delete "tags" and insert in place thereof -- tag --.

Line 15, delete "by;" and insert in place thereof -- by: --.

Signed and Sealed this

Eighth Day of July, 2008

JON W. DUDAS
*Director of the United States Patent and Trademark Office*